US007384094B2

(12) United States Patent
Siedlecki et al.

(10) Patent No.: US 7,384,094 B2
(45) Date of Patent: Jun. 10, 2008

(54) GRILLE OVERSLAM BUMPER INTEGRATED WITH SECONDARY RELEASE HANDLE

(75) Inventors: Tad J. Siedlecki, Dearborn, MI (US); Kalani Mitchell, Rancho Cucamonga, CA (US); Stephen L. Bruford, West Bloomfield, MI (US); J. Fritz Cory, Belleville, MI (US); Dragan Stojkovic, Southgate, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/548,950

(22) Filed: Oct. 12, 2006

(65) Prior Publication Data

US 2008/0088155 A1 Apr. 17, 2008

(51) Int. Cl.
*B62D 25/10* (2006.01)

(52) U.S. Cl. ................. 296/193.11; 296/207; 180/69.22

(58) Field of Classification Search ............ 296/193.11, 296/207; 180/69.22; 292/DIG. 5, DIG. 14, 292/DIG. 42, DIG. 43; 293/115
See application file for complete search history.

(56) References Cited

U.S. PATENT DOCUMENTS 2,232,865 A * 2/1941 Pizzo .......................... 292/41
4,151,891 A * 5/1979 Parr ........................ 180/69.21
4,961,601 A * 10/1990 Lindholm et al. ........... 292/216
5,431,460 A 7/1995 Hass et al.
6,014,876 A 1/2000 Taylor
6,769,171 B2 8/2004 Jung
6,923,496 B1 * 8/2005 Pleet et al. ............. 296/193.11

FOREIGN PATENT DOCUMENTS

JP 57138472 8/1982
JP 5033537 2/1993
JP 7127320 5/1995

* cited by examiner

*Primary Examiner*—Dennis H Pedder
(74) *Attorney, Agent, or Firm*—Gigette Bejin, Esq.; Dykema Gossett PLLC

(57) ABSTRACT

A vehicle hood closure control and release system including a hood release mounted to a vehicle frame. The hood release may include a pivotally mounted hood release handle pivotable for unlatching a vehicle hood having a grille mounted thereon. A bumper may be integrally mounted to the hood release for resiliently contacting the grille and preventing slamming of the grille when the vehicle hood is moved from an open to a closed position.

18 Claims, 8 Drawing Sheets

GRILLE OVERSLAM BUMPER INTEGRATED WITH SECONDARY RELEASE HANDLE

BACKGROUND OF INVENTION a. Field of Invention

The invention relates generally to grilles for motor vehicles and the like, and, more particularly to devices for facilitating opening of a hood having a grille attached thereto and for preventing slamming of the grille into other components during closing of the hood.

b. Description of Related Art

As is known in the art, motor vehicle grilles are generally mounted to a hood or to a vehicle body or bumper for providing a source of ventilation for the radiator and the engine compartment, as well as for serving as a protective barrier for preventing contaminants from entering into the engine compartment. Compared to cars, trucks generally have significantly larger grilles that are often attached to the upper edge of the hood for aesthetic or other operational purposes. For example, attachment of the grille to the hood as opposed to the bumper may be necessitated by assembly feasibility and/or government crash regulations for automobile bumpers.

For trucks including a hood having a grille attached thereto, the hood structure is therefore significantly longer than that of cars. When a truck hood is closed, the grille can vibrate or contact a closure restraint with excessive force. Alternatively, when the truck is in motion, the grille can be a source of vibration.

It would therefore be of benefit to provide a structure for minimizing grille vibrations during movement of a truck, as well as for minimizing grille impact forces during closing of the hood.

Yet further, in order to comply with government regulations, a hood release generally includes a two-stage release process. First the hood may be partially release by pulling a release lever from the inside of a vehicle, and secondly, the hood may be fully released by activating a secondary release lever provided adjacent the hood front edge. For trucks, due to the integration of the grille at the front edge of the hood, this release function further requires modification and optimal design of the general secondary release to accommodate for the grille.

Because of the limited space in today's modern vehicles, the mechanism for providing the aforementioned hood release operation and its associated wiring, as well as the mechanism for controlling hood vibrations during vehicle movement and during hood closing must be adequately designed.

Exemplary structures for facilitating release of vehicle hoods and for controlling hood vibrations are disclosed, for example, in U.S. Pat. No. 6,923,496 and Japanese Patent No. 05-033537.

While the respective mechanisms disclosed in the aforementioned patents provide vibration control and hood release functions, it would nevertheless be of benefit to provide an improved hood release and vibration control mechanism operable with trucks and the like having a grille mounted to the front edge of the hood. It would also be of benefit to provide a mechanism which is simple to manufacture and assemble onto existing vehicles having hood/grille combinations without requiring significant redesign of the hood, grille or adjacent areas.

SUMMARY OF THE INVENTION

The invention solves the problems and overcomes the drawbacks and deficiencies of prior art hood vibration control and release mechanisms by providing a vehicle hood closure control and release system including a hood release mounted to a vehicle frame. The hood release may include a pivotally mounted hood release handle pivotable for unlatching a vehicle hood having a grille mounted thereon. A bumper may be integrally mounted to the hood release for resiliently contacting the grille and preventing slamming of the grille (for example into other components) when the vehicle hood is moved from an open to a closed position.

For the system described above, in an exemplary embodiment, the bumper may be made of an ethylene propylene diene monomer (EPDM) rubber. The bumper may include a semi-cylindrical overslam control member contiguously engageable with the grille when the vehicle hood is in the closed position. The overslam control member may include a leg having an enlarged area disposable in a complementary slot in the hood release for attaching the overslam control member to the hood release. The hood release handle may be disposable in a slot in the hood release, with the hood release handle being pivotally mounted to pull a release cable for unlatching the vehicle hood. The hood release handle may be pivotable in a clockwise or counter-clockwise direction along a vehicle longitudinal direction. The hood release may include a rib engageable with the bumper for limiting movement of the bumper during closing of the vehicle hood or due to vehicle vibration.

The invention also provides a vehicle hood vibration control and release system including a hood release mounted to a vehicle structure. The hood release may include a hood release handle movable for unlatching a vehicle hood having a grille mounted thereon. A bumper may be integrally mounted to the hood release for resiliently contacting the grille and preventing slamming of the grille when the vehicle hood is moved from an open to a closed position.

The invention yet further provides a vehicle including a hood closure control and release system including a hood release mounted to a vehicle structure. The hood release may include a hood release handle movable for unlatching a vehicle hood having a grille mounted thereon. A bumper may be integrally mounted to the hood release for resiliently contacting the grille and preventing slamming of the grille (for example into other components) when the vehicle hood is moved from an open to a closed position.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
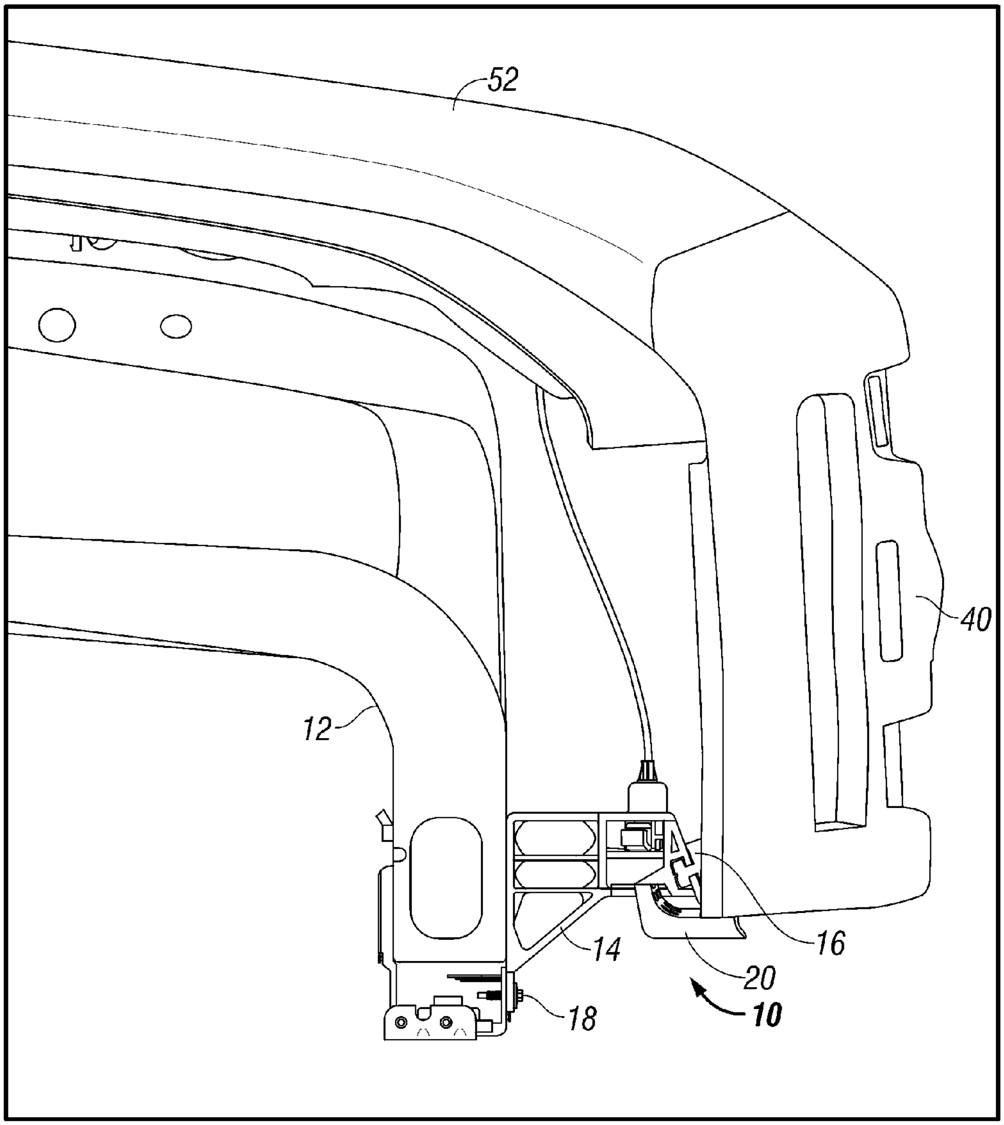
FIG. 1 is an illustrative left side view of an integrated grille overslam bumper and secondary hood release according to the present invention illustrated in a mounted configuration.
Figure 2:
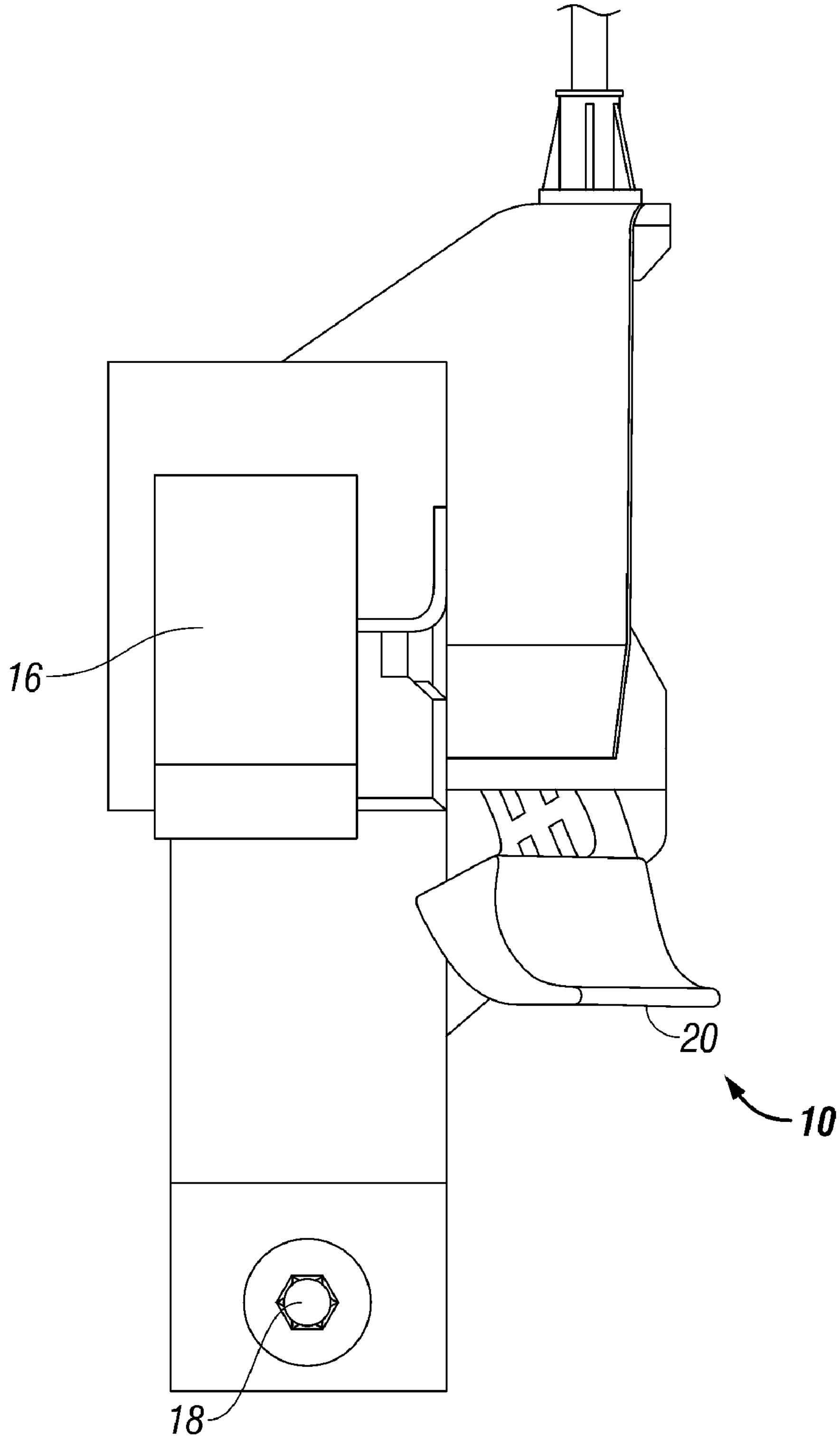
FIG. 2 is a front view of the integrated grille overslam bumper and secondary hood release of FIG. 1.

Referring now to the drawings wherein like reference numerals designate corresponding parts throughout the several views, FIGS. 1-7B illustrate various views of an integrated grille overslam bumper and secondary hood release according to the present invention, generally designated "integrated bumper and hood release system" 10.

Referring to FIGS. 1-7B and particularly FIG. 1, the invention provides an integrated bumper and hood release system 10 mounted, for example, to a vehicle frame 12. Alternatively, bumper and hood release system 10 may be mounted the vehicle bumper, or another vehicle structural or fixed component. However, it is advantageous to mount system 10 to the vehicle frame to minimize build variations. System 10 may generally include a secondary hood release 14 and a bumper 16 fixedly attached thereto. Secondary hood release 14 may be mounted to vehicle frame 12 by means of a bolt 18, clip or welding (for a metallic structure) and the like. Secondary hood release 14 may include a hood release handle 20 pivotally mounted to shaft 22 (see FIG. 4) and pivotable by clockwise rotation of the handle relative to the vehicle longitudinal direction in the embodiment illustrated. Hood release handle 20 may include a concave extension 24 for permitting a user to engage the handle by one or more fingers. Those skilled in the art would readily appreciate in view of this disclosure that a variety of other extension configurations may be used for hood release handle 20, and the particular design may be based on the design of grille 40 (see FIG. 1), the bumper area of a vehicle, or the ergonomic needs of a customer.

Figure 4:
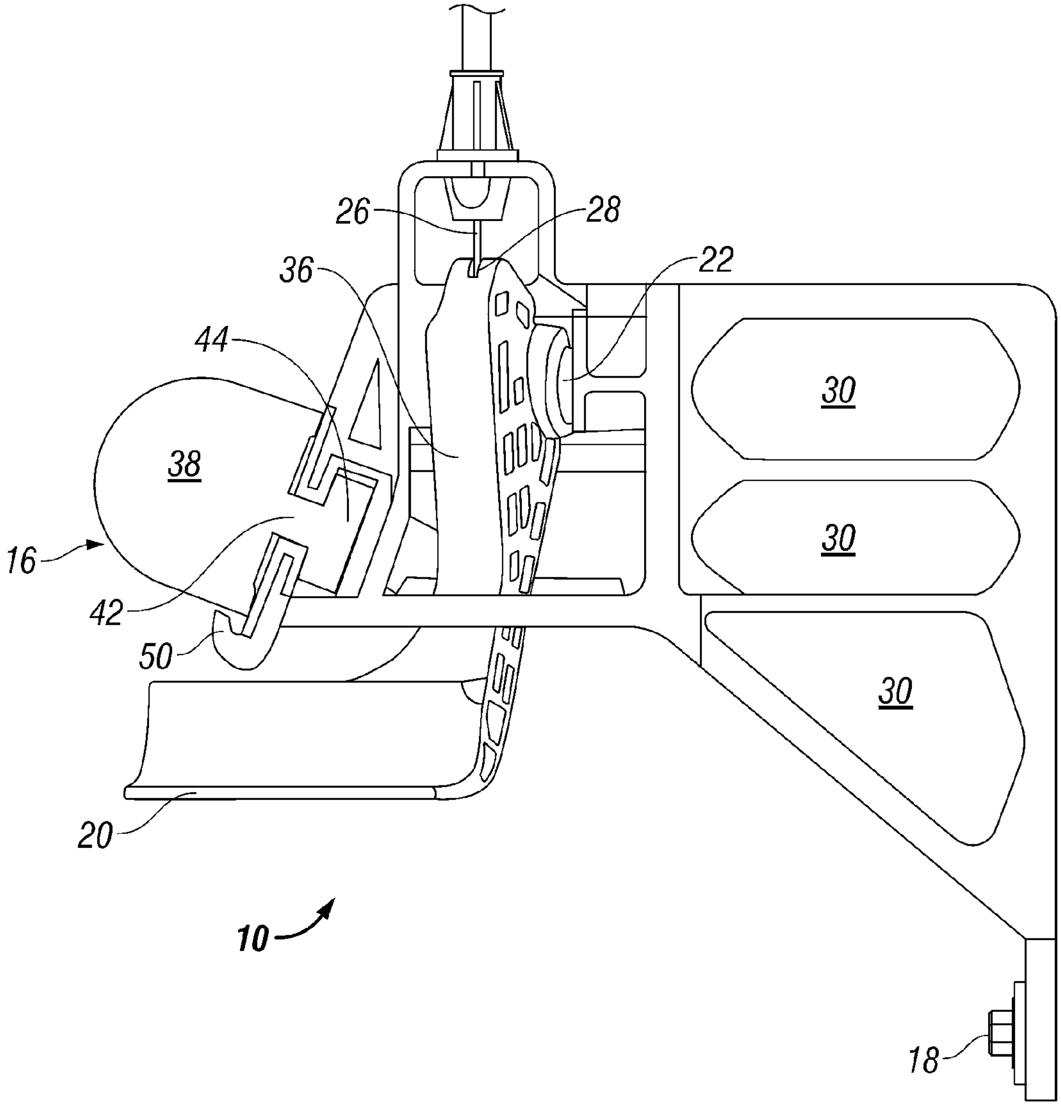
FIG. 4 is a right side view of the integrated grille overslam bumper and secondary hood release of FIG. 1, illustrating the pivotal mount of the secondary hood release handle.
Figure 5:
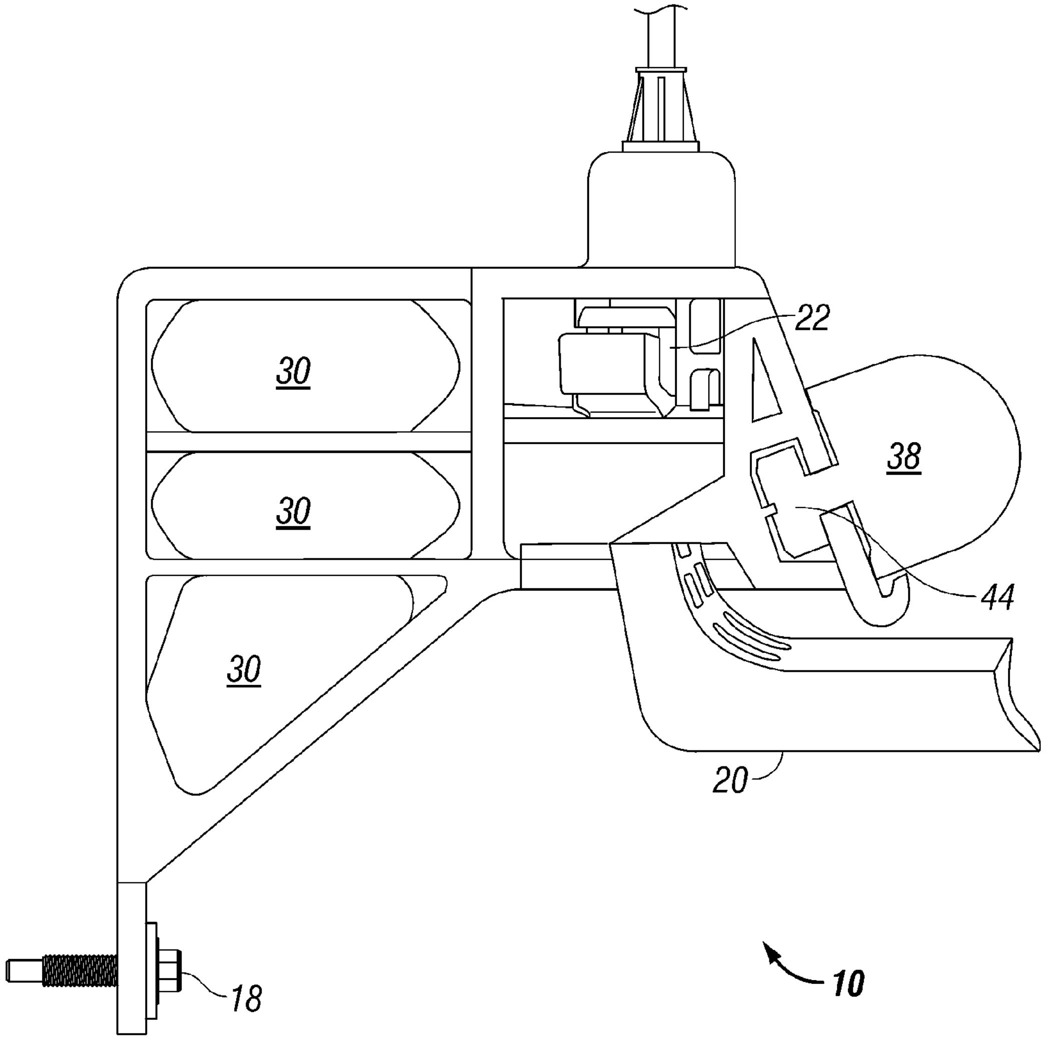
FIG. 5 is an enlarged left side view of the integrated grille overslam bumper and secondary hood release of FIG. 1, illustrating the pivotal mount of the secondary hood release handle.
Figure 6:
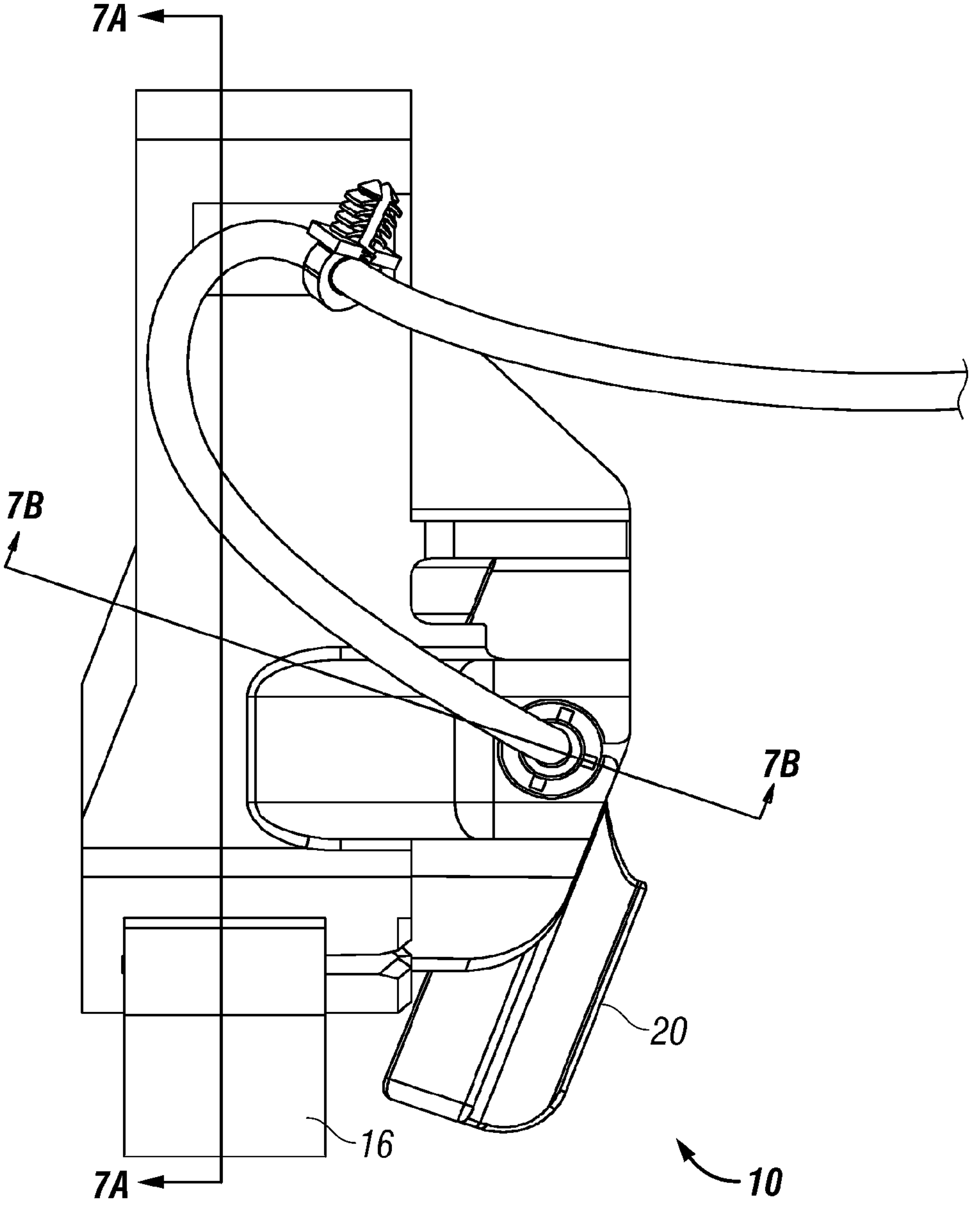
FIG. 6 is a top view of the integrated grille overslam bumper and secondary hood release of FIG. 1.
Figure 7A:
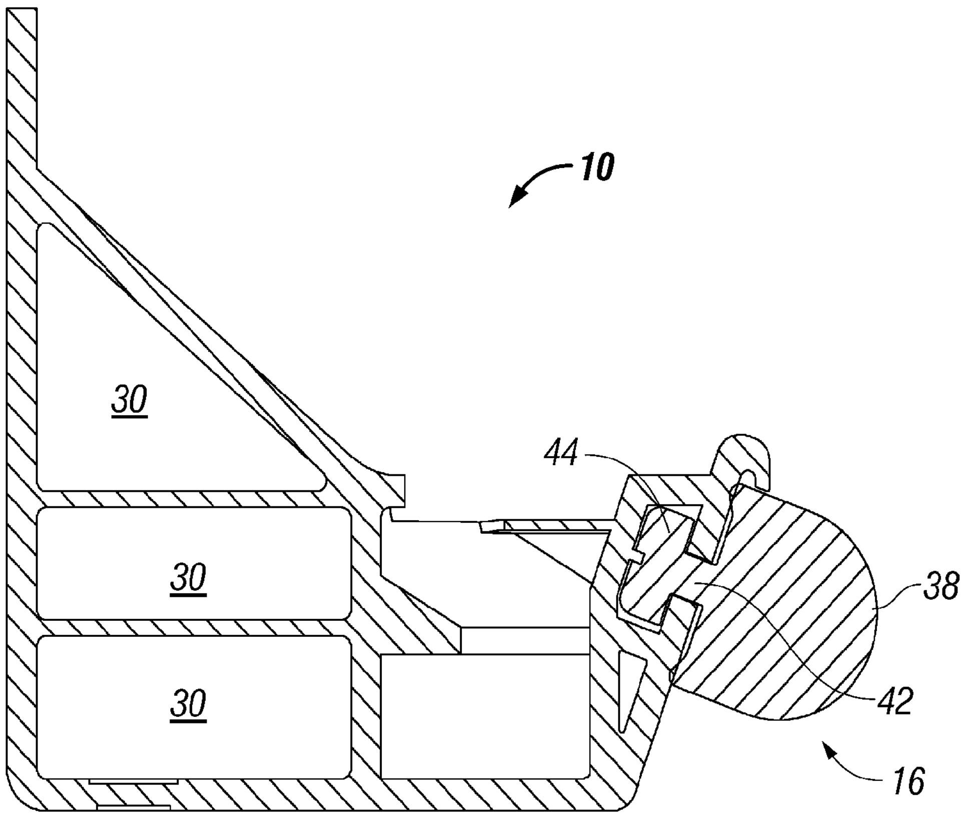
FIGS. 7A and 7B are cross-sectional views of the integrated grille overslam bumper and secondary hood release of FIG. 1, taken generally respectively along lines 7A-7A and 7B-7B in FIG. 6.
Figure 7B:
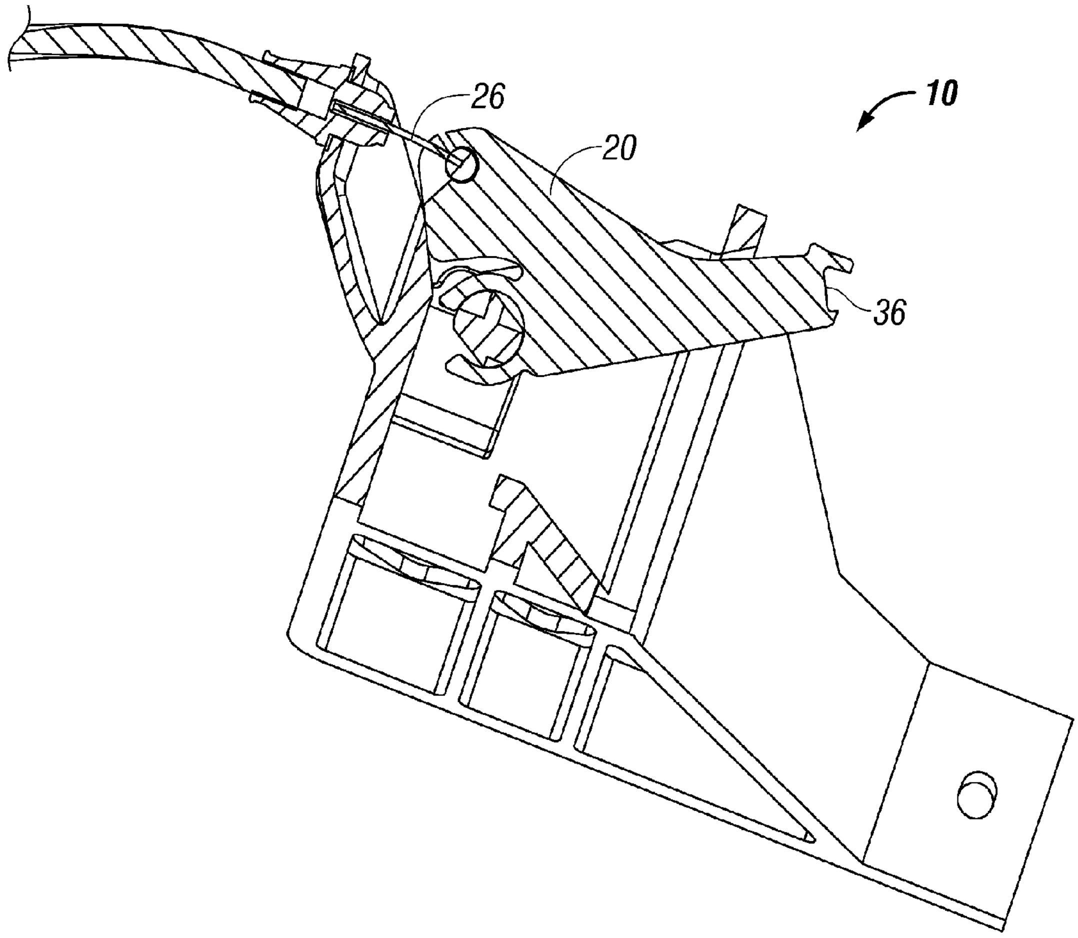

As shown in FIG. 4, hood release handle 20 may include a release cable 26 attached thereto at 28, with the cable being attached at its opposite end to a latch (not shown) for unlatching the hood.

Figure 3:
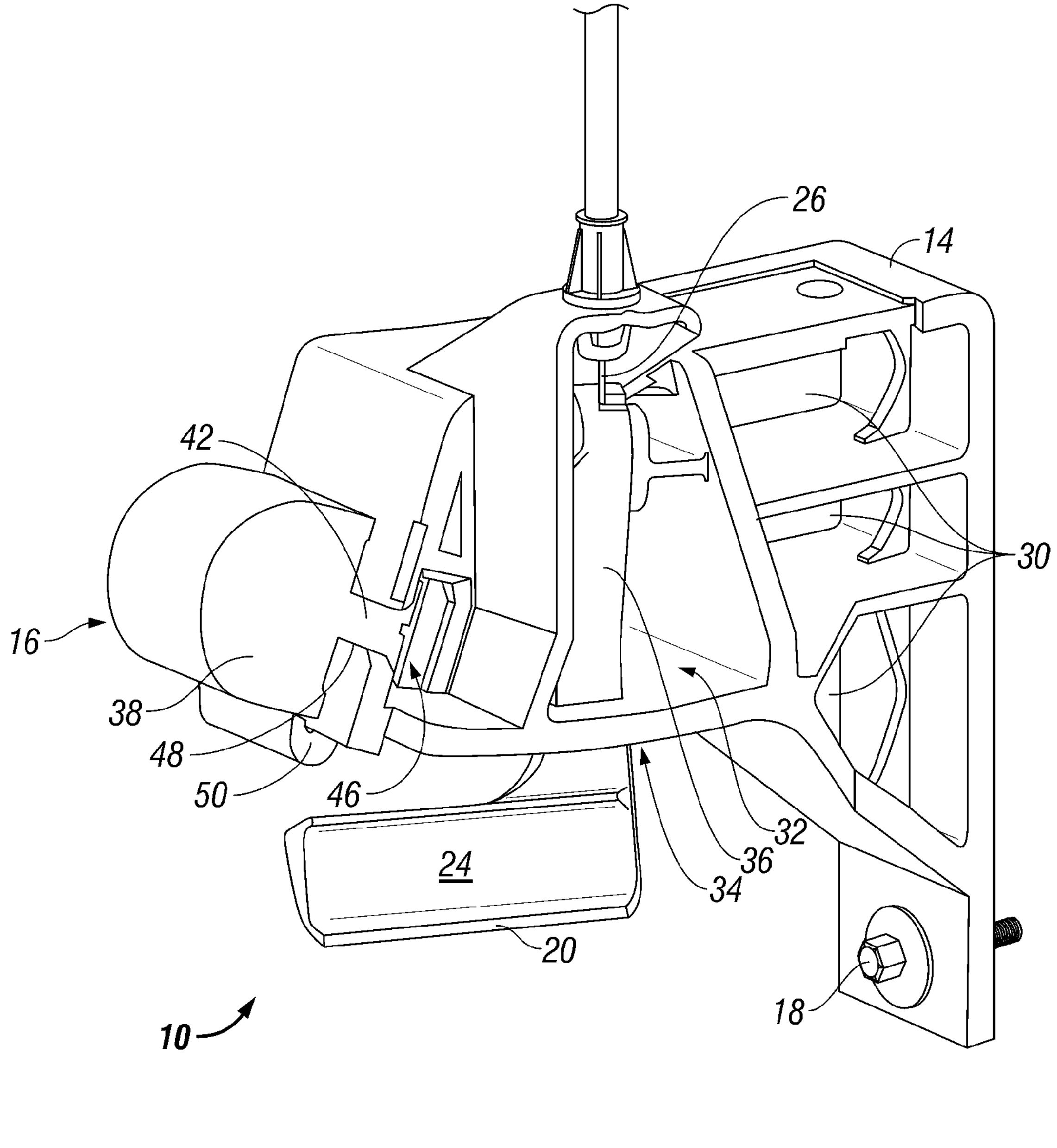
FIG. 3 is an isometric view of the integrated grille overslam bumper and secondary hood release of FIG. 1, particularly illustrating the mounting of the grille overslam bumper and the secondary hood release handle.

Referring to FIG. 3, secondary hood release 14 may generally include a plurality of slots 30, primarily for minimizing the weight thereof. A slot 32 may be provided with an opening 34 for insertion of leg 36 of hood release handle 20 in an upward direction relative to secondary hood release 14 in the orientation of FIG. 3. With leg 36 inserted in slot 32, release cable 26 may be attached as shown at the end of leg 36 via a cable/shaft or another such arrangement, and hood release handle 20 may be pivotally attached to shaft 22 (see FIG. 4). In the configuration illustrated, the distance between shaft 22 and the attachment 28 for cable 26 to leg 36 may be dimensioned to result in a predetermined degree of movement of cable 26 upon rotation of hood release handle 20.

As shown in FIGS. 1-4, bumper 16 having a semi-cylindrical overslam control member 38 may be attached to secondary hood release 14 for engaging grille 40 during closing of hood 52 and during movement of the vehicle to minimize grille vibrations. Bumper 16 may include a leg 42 having an enlarged area 44 disposable in complementary slot 46 in secondary hood release 14. A cutout 48 may be provided for insertion of leg 42 of the bumper. Leg 42 and/or enlarged area 44 may be respectively dimensioned larger than cutout 48 or slot 46 for providing an interference fit for bumper 16 with secondary hood release 14. Secondary hood release 14 may further include a rib 50 engageable with an underside of bumper 16 for limiting downward movement of the bumper when hood 52 having grille 40 is first closed with force, and further, when grille 40 remains in contact with the bumper after hood 52 is closed. In the exemplary embodiment illustrated, bumper may be made of an ethylene propylene diene monomer (EPDM) rubber, or other resilient materials used for automobile components.

The assembly and operation of integrated bumper and hood release system 10 will now be described in detail with reference to FIGS. 1, 3 and 4.

As shown in FIGS. 1, 3 and 4, in order to assemble and utilize integrated bumper and hood release system 10, secondary hood release 14 may first be attached to vehicle frame 12 using bolt 18. Hood release handle 20 may then be inserted through opening 34 and release cable 26 connected thereto at location 28. Hood release handle 20 may then be attached to shaft 22 by means of an interference fit for pivotal movement thereof. Bumper 16 may then be installed onto secondary hood release 14 by inserting leg 42 and enlarged area 44 thereof respectively into cutout 48 and complementary slot 46. Alternatively, the aforementioned components may be provided in a pre-assembled configuration and installed as a single unit to vehicle frame 12.

With bumper 16 and secondary hood release 14 assembled and installed as discussed above, in order to release hood 52, a user may first disengage a primary release latch (not shown) by pulling or otherwise operating a release handle (not shown) inside the vehicle. The user may then release secondary hood release 14 by rotating hood release handle 20 to open hood 52. The user may then close hood 52, with bumper 16 contacting grille 40 to prevent slamming of the grille against the radiator (not shown) or other components adjacent secondary hood release 14. Further, during movement of the vehicle, bumper 16 may prevent vibration of grille 40.

Those skilled in the art would readily appreciate in view of this disclosure that various modifications could be made to the integrated bumper and hood release system 10 described above, without departing from the scope of the present invention. For example, while bumper 16 is shown in a semi-cylindrical configuration, bumper 16 may be provided in a variety of configurations for adequately contacting and preventing vibration of grille 40, with the particular configuration being based on the space and strength requirements for operation with a particular vehicle. Instead of leg 42 and enlarged area 44, a variety of other configurations may be used for attaching bumper 16 to secondary hood release 14, such as an interference fit of an enlarged convex area in a concave slot in a ball/socket type arrangement. Alternatively, bumper 16 may be mounted to secondary hood release by adhesive or use of a fastener. Further, as briefly discussed above, hood release handle 20 may be provided in a variety of configurations specifically designed for permitting movement of release cable 26 and unlatching of the secondary latch (not shown), and the specific design thereof may be based on the particular grille configuration for a given vehicle.

To summarize, the present invention thus provides an improved hood release and vibration control mechanism which prevents slamming of the grille, with the mechanism being simple to manufacture and assemble onto existing vehicles having hood/grille combinations without requiring significant redesign of the hood, grille or adjacent areas.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle hood closure control and release system comprising:

a hood release mounted to a vehicle frame, said hood release including a pivotally mounted hood release handle pivotable for unlatching a vehicle hood having a grille mounted thereon; and a bumper integrally mounted to said hood release for resiliently contacting the grille and preventing slamming of the grille when the vehicle hood is moved from an open to a closed position.

2. A system according to claim 1, wherein said bumper is made of an ethylene propylene diene monomer (EPDM) rubber.

3. A system according to claim 1, wherein said bumper includes a semi-cylindrical overslam control member contiguously engageable with the grille when the vehicle hood is in the closed position, said overslam control member including a leg having an enlarged area disposable in a complementary slot in said hood release for attaching said overslam control member to said hood release.

4. A system according to claim 1, wherein said hood release handle is disposable in a slot in said hood release, said hood release handle is pivotally mounted to pull a release cable for unlatching the vehicle hood.

5. A system according to claim 1, wherein said hood release handle is pivotable in one of a clockwise and counter-clockwise direction along a vehicle longitudinal direction.

6. A system according to claim 1, wherein said hood release includes a rib engageable with said bumper for limiting movement of said bumper during closing of the vehicle hood.

7. A vehicle hood vibration control and release system comprising:

a hood release mounted to a vehicle structure, said hood release including a hood release handle movable for unlatching a vehicle hood having a grille mounted thereon; and a bumper integrally mounted to said hood release for resiliently contacting the grille and preventing slamming of the grille when the vehicle hood is moved from an open to a closed position.

8. A system according to claim 7, wherein said bumper is made of an ethylene propylene diene monomer (EPDM) rubber.

9. A system according to claim 7, wherein said bumper includes a semi-cylindrical overslam control member contiguously engageable with the grille when the vehicle hood is in the closed position, said overslam control member including a leg having an enlarged area disposable in a complementary slot in said hood release for attaching said overslam control member to said hood release.

10. A system according to claim 7, wherein said hood release handle is disposable in a slot in said hood release, said hood release handle is pivotally mounted to pull a release cable for unlatching the vehicle hood.

11. A system according to claim 7, wherein said hood release handle is pivotable in one of a clockwise and counter-clockwise direction along a vehicle longitudinal direction.

12. A system according to claim 7, wherein said hood release includes a rib engageable with said bumper for limiting movement of said bumper during closing of the vehicle hood.

13. A vehicle including a hood closure control and release system comprising:

a hood release mounted to a vehicle structure, said hood release including a hood release handle movable for unlatching a vehicle hood having a grille mounted thereon; and a bumper integrally mounted to said hood release for resiliently contacting the grille and preventing slamming of the grille when the vehicle hood is moved from an open to a closed position.

14. A vehicle according to claim 13, wherein said bumper is made of an ethylene propylene diene monomer (EPDM) rubber.

15. A vehicle according to claim 13, wherein said bumper includes a semi-cylindrical overslam control member contiguously engageable with the grille when the vehicle hood is in the closed position, said overslam control member including a leg having an enlarged area disposable in a complementary slot in said hood release for attaching said overslam control member to said hood release.

16. A vehicle according to claim 13, wherein said hood release handle is disposable in a slot in said hood release, said hood release handle is pivotally mounted to pull a release cable for unlatching the vehicle hood.

17. A vehicle according to claim 13, wherein said hood release handle is pivotable in one of a clockwise and counter-clockwise direction along a vehicle longitudinal direction.

18. A vehicle according to claim 13, wherein said hood release includes a rib engageable with said bumper for limiting movement of said bumper during closing of the vehicle hood.

* * * * *